United States Patent
Gifford

[15] 3,693,651
[45] Sept. 26, 1972

[54] VALVE ASSEMBLY
[72] Inventor: Robert T. Gifford, Green County, Ohio
[73] Assignee: Vernay Laboratories, Inc., Yellow Springs, Ohio
[22] Filed: Aug. 19, 1970
[21] Appl. No.: 65,129

[52] U.S. Cl. ............................... 137/493, 137/525.3
[51] Int. Cl. ............................................. F16k 15/16
[58] Field of Search ............ 137/493, 493.1, 469, 525, 525.3, 137/493.7, 493.8, 493.9, 525.5

[56] References Cited

UNITED STATES PATENTS

| | | | |
|---|---|---|---|
| 1,506,012 | 10/1921 | Lewis | 137/525 |
| 3,033,230 | 5/1962 | Brand | 137/525 X |
| 2,487,415 | 11/1949 | Bennett | 137/525 X |
| 2,571,893 | 10/1951 | Kendall | 137/525 X |
| 2,718,897 | 9/1955 | Andrews | 137/525 X |
| 3,354,903 | 11/1967 | Caruso | 137/525.3 X |
| 2,752,943 | 7/1956 | Doeg | 137/525.5 X |
| 2,925,093 | 2/1960 | Brand | 137/525.3 |
| 2,942,423 | 6/1960 | Brand | 137/525.3 X |
| 3,085,591 | 4/1963 | Schneider | 137/525.3 |
| 3,568,977 | 3/1971 | Nelson | 137/525.3 X |

FOREIGN PATENTS OR APPLICATIONS

| | | | |
|---|---|---|---|
| 1,018,283 | 10/1957 | Germany | 137/525.5 |

*Primary Examiner*—M. Cary Nelson
*Assistant Examiner*—Robert J. Miller
*Attorney*—Marechal, Biebel, French & Bugg

[57] ABSTRACT

A valve assembly for venting a structure such as an automobile transmission, includes a closure cap which fits over the vent opening in the structure and a dish-shaped, one-piece resilient valve member which fits over the vent opening and is flexed into sealing engagement by the closure cap. Venting takes place when pressure builds up sufficiently inside the structure to flex the valve member out of sealing engagement and allow excess pressure to escape around the flexed valve member and through an outlet in the cap. In a modification, the central portion of the valve member, which is contacted by the cap, has an opening formed in it which is normally closed by the contact with the cap, but which may be flexed inwardly, uncovering the opening, to provide vacuum relief for the interior of the structure.

5 Claims, 3 Drawing Figures

PATENTED SEP 26 1972
3,693,651
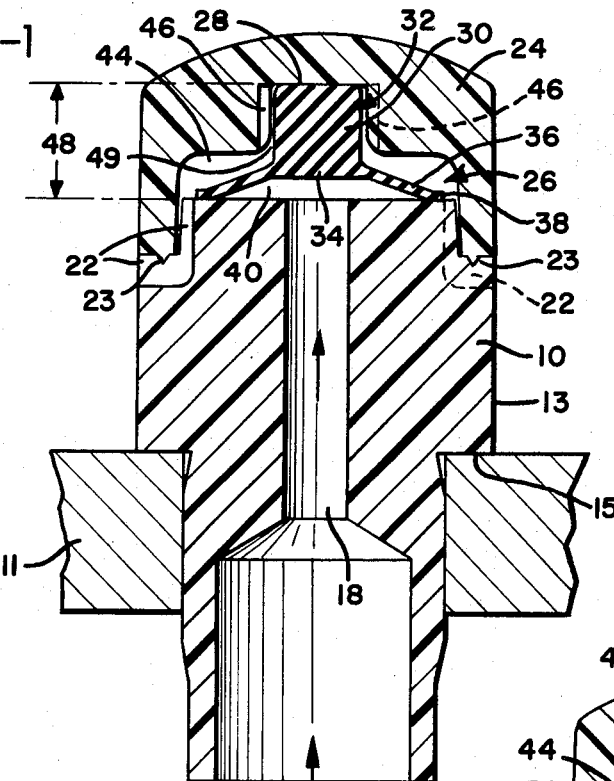
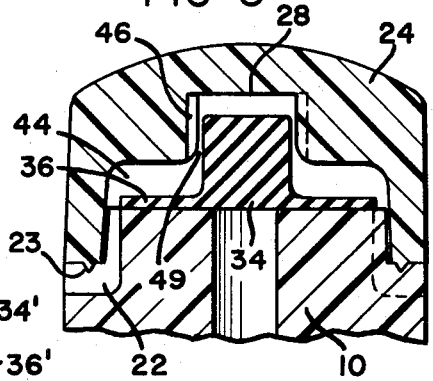
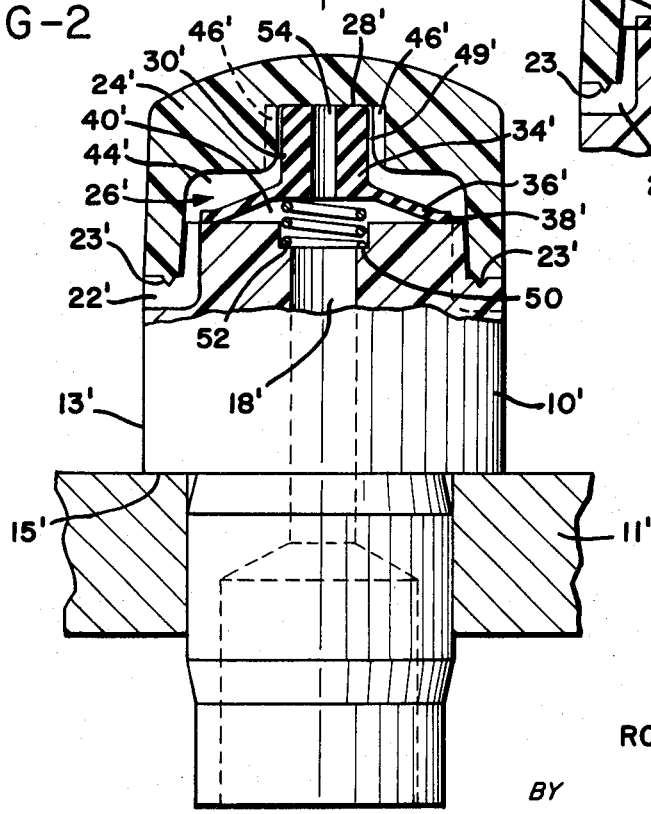
INVENTOR
ROBERT T. GIFFORD
BY
Marechal, Biebel, French & Bugg
ATTORNEYS

VALVE ASSEMBLY

BACKGROUND OF THE INVENTION

Pressure relief valves are found in a variety of environments. For example, U.S. Pat. No. 2,456,213 discloses a valve structure used in conjunction with a flushing tank to prevent siphoning. In this construction pressure relief is attained around a valve member which normally covers a series of ports but which is sufficiently flexible to flex out of sealing relationship with the ports so that pressure may be relieved through a central opening in the valve member. U.S. Pat. No. 2,571,893 also discloses a pressure relief valve, used in this instance in conjunction with a venting cap for storage batteries. In this construction the valve is manufactured of flexible material and mounted over a venting opening in the battery cap. U.S. Pat. No. 3,159,176, assigned to the assignee of the present invention, also discloses a venting type of valve in which bypass openings are normally closed by the flexible, outwardly extending lips of the valve member and the center of the valve has an opening formed therein which is normally closed by a duckbill portion.

Despite the well developed state of this art as exemplified by the above noted patents, there still exists a need for a virtually trouble free valve assembly of compact, relatively simple construction and which can, therefore, be readily and inexpensively produced on a high volume basis.

SUMMARY OF THE INVENTION

The present invention provides a valve assembly which utilizes a one-piece, resilient valve member of simple construction which can be installed over a vent opening to provide venting relief when a predetermined internal pressure in the structure is exceeded. The valve member is retained in place over the vent opening by means of a closure cap which engages the central portion of the valve member and flexes it downwardly in sealing relationship about the vent opening. The valve member itself is not interlocked with any other structure and is, therefore, free to flex as required to provide venting relief.

In one embodiment of the invention the valve member is formed as a one-piece imperforate member which may be readily and inexpensively produced. In another embodiment of the invention pressure relief may be accomplished both into and out of the vented structure by merely forming the valve member with an opening through the center thereof. In either case, however, the valve member is always relatively free to move with respect to the vent opening and is operable within a fairly wide range of predetermined relief pressures.

BRIEF DESCRIPTION OF THE DRAWINGS

FIG. 1 is a cross-sectional view through a valve assembly in accordance with the present invention;

FIG. 2 is a view similar to FIG. 1 but showing a second preferred embodiment of the invention; and FIG. 3 is a view of a portion of the structure of FIG. 1 showing the valve member thereof in a different position.

DESCRIPTION OF THE PREFERRED EMBODIMENTS

With reference to FIG. 1 of the drawings it will be seen that a valve assembly in accordance with the present invention comprises a base structure 10 which is receivable in a member, such as an automobile transmission housing or structure, a portion of which is shown at 11. Base structure 10 is provided with an annularly projecting flange 13 forming a shoulder 15 which abuts against the outer surface of the vented structure 11 when the valve assembly is installed. The base structure 10 is also provided with an axially extending vent opening 18 and a plurality of outlets 22. A closure cap 24 is attached to the base structure by heat sealing or the like, as at 23, to place it in spaced relationship to the base structure and define therewith a valve chamber 26.

A socket 28 is formed in a central portion of the cap 24 and receives therein the complementarily shaped plug 30 of a resilient, one-piece valve member 32 with the socket 28 and plug 30 serving as guide members to maintain valve member 32 properly positioned. Valve 32 also includes a central portion 34 a medial portion 36 projecting outwardly from the central portion and in a direction opposite to the direction of projection of the plug 30 to form a dish-shaped member, and a peripheral portion 38, with the medial portion 36 dividing the valve chamber 26 into inner and outer sections 40 and 44. It will also be noted from FIG. 1 of the drawings, that the interface between the plug 30 and the walls of the socket 28 is relieved by a series of bleed grooves 46 positioned at spaced intervals about the socket 28.

With the above noted construction, excess pressure from the interior of the structure 11 is vented out through the bore 18 in the direction indicated by the arrows. Thus, the flow is from the interior of the structure to the inner section 40 of the valve chamber 26 then, by the flexing of the valve member, outwardly into the outer section 44 and thence, through the outlets 22 to ambient conditions. With the above construction the internal pressure at which the valve will vent can be controlled in a number of ways. Thus, the thickness of the medial portion can be varied as well as the hardness of the elastomeric material from which the valve is made and the area enclosed by the peripheral portion in contact with the base structure.

Additionally, it should be noted that the dimension of the valve chamber 26, measured between opposing portions of the closure cap and the base structure and indicated at 48, is less than the undistorted thickness of the valve member. As a result, the valve will be flexed into sealing engagement with the base structure, defining the peripheral portion 38 contacting the base structure when the closure cap is applied. Of course, it will be apparent that the flattened peripheral portion could also be formed in the process of manufacturing the valve member. In any event, by proportioning this dimension for a valve member of a given thickness, hardness and size it will be apparent that the valve member can be made to vent at a predetermined load. This allows a fairly wide range of predetermined relief pressures to be vented using the construction of FIG. 1, with such pressures ranging from less than 1 psi up to several psi.

It will also be seen that should the pressure in the interior of the structure 11 decrease below ambient, thus in effect, developing a negative pressure in the component being vented, the valve is free to flex inwardly to the position shown in FIG. 3 with the plug 30 riding in the socket 28 but still maintained centrally positioned with respect to the vent opening 18. In this regard it will be noted that a clearance, as at 49, is provided between the plug and socket walls to prevent both the build up of a negative pressure between the upper end of the plug 30 and the opposing surface of the socket 28 as the plug moves outwardly of the socket and the build up of a positive pressure as the plug moves back into the socket. The plug 30 is, therefore, able to move freely into and out of the socket 28 to prevent gross distortion of the valve member. Additionally, the bleed grooves 46 insures that even if the space 49 becomes clogged the plug 30 can still move freely within the socket 28.

Turning now to FIG. 2 of the drawings, a second preferred embodiment of the invention will be described which permits venting in both directions with respect to the component with which the valve assembly is associated. As in the embodiment of FIG. 1 the valve assembly of FIG. 2 is intended to be installed in an opening in a structure, a portion of which is shown at 11', and which abuts against a shoulder 15' of an outwardly projecting flange 13' on the base structure 10' of the valve assembly.

Similarly, a closure cap 24' is attached by heat sealing or the like, as at 23', to the end of the base structure 10' and an axially extending venting opening 18' and outlets 22' are formed therein. The closure cap 24' is provided with a socket 28' receiving a complementarily shaped plug 30' and a plurality of bleed grooves 46' are positioned about the interface between the plug 30' and the socket 28'. It will also be seen that the valve member, in addition to the plug 30' includes a central portion 34', a medial portion 36' and a peripheral portion 38' which serves to divide the valve chamber 26' into an inner section 40' and an outer section 44'.

Unlike the embodiment of FIG. 1, however, it will be seen that the vent opening 18' is enlarged adjacent its intersection with the valve chamber to define a shoulder 50 upon which a resilient member, such as a coil spring 52, rests and urges the central portion 34' into contact with the closure cap 24'. It will also be seen that the valve member is provided with a passageway 54 extending from the inner section 40' of the valve chamber through the plug 30' and into the socket 28'. With the above construction it will be seen that the valve assembly serves not only to vent excess pressure from the interior of the structure 11 but also functions to permit pressure relief in the opposite direction when some predetermined pressure differential exists.

Thus, should the pressure interiorally of the structure 11 decrease below the exterior pressure in an amount sufficient to overcome the resistance of the spring 52 and the natural resilience of the valve member, the valve member will be depressed downwardly toward the base structure, allowing pressure to equalize through outlets 22', the space 49' between the plug and socket walls, and the central passageway 54. Of course, should the space 49' become obstructed the grooves 46' will still provide communication between passageway 54 and outlets 22'. Additionally, it will be apparent that instead of providing a separate coil spring, the resiliency of the valve member itself could, by varying its thickness and the hardness of the elastomeric material of which it is formed, give the proper resiliency to relieve at some predetermined pressure differential.

From the above it will be seen that the present invention provides a relatively simple and inexpensive, yet dependable valve assembly for relieving pressures from sealed components.

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. A preloaded valve assembly comprising:
   a. a base structure having means defining a vent therefrom,
   b. a closure cap mounted over said vent in spaced relationship to said base structure and defining therewith a valve chamber,
   c. a resilient valve member having a central portion, a medial portion projecting outwardly from said central portion, and a peripheral portion projecting outwardly of said medial portion,
   d. said valve member being positioned in said chamber with said central portion engaging said closure cap, said medial portion extending in spaced relationship to said closure member and base structure and dividing said chamber into inner and outer sections and said peripheral portion making sealing contact about said vent and positioning it in said outer section of said chamber,
   e. the dimension of said valve chamber measured between opposing portions of said spaced closure cap and base structure being less than the undistorted thickness of said valve member to press said peripheral portion in sealing engagement about said vent with a predetermined load,
   f. means defining an outlet from said outer section of said chamber, and
   g. means defining a passageway through said central portion of said valve member with said closure cap normally blocking said passageway.

2. A preloaded valve assembly comprising:
   a. a base structure having means defining a vent therefrom,
   b. a closure cap mounted over said vent in spaced relationship to said base structure and defining therewith a valve chamber,
   c. a resilient valve member having a central portion, a medial portion projecting outwardly from said central portion, and a peripheral portion projecting outwardly of said medial portion,
   d. said valve member being positioned in said chamber with said central portion engaging said closure cap, said medial portion extending in spaced relationship to said closure member and base structure and dividing said chamber into inner and outer sections and said peripheral portion making sealing contact about said vent and positioning it in said outer section of said chamber, e. the dimension of said valve chamber measured between opposing portions of said spaced closure cap and base structure being less than the undistorted thickness of said valve member to press said peripheral portion in sealing engagement about said vent with a predetermined load, f. means defining an outlet from said outer section of said chamber, g. means defining a socket in said closure cap, h. means defining a plug on said central portion of said valve member received in said closure cap socket, and i. means defining bleed grooves intermediate opposing surfaces of said plug and socket.

3. The assembly of claim 2 wherein:

a. said bleed grooves are formed in a wall of said closure cap socket.

4. The assembly of claim 1 further comprising:

a. means defining a socket in said closure cap, and b. means defining a plug projecting from said central portion into said socket, c. said passageway extending from said inner section of said valve chamber through said plug into said socket.

5. The assembly of claim 1 further comprising:

a. resilient means mounted in said inner section and urging said central portion into passageway closing contact with said closure cap.

* * * * *